United States Patent Office 3,042,702
Patented July 3, 1962

3,042,702
ORGANIC PHOSPHORUS COMPOUNDS
Gail H. Birum, Dayton, Ohio, assignor to Monsanto Chemical Company, St. Louis, Mo., a corporation of Delaware
No Drawing. Filed Nov. 12, 1959, Ser. No. 852,206
3 Claims. (Cl. 260—461)

This invention relates to organic compounds of phosphorus.

An object of this invention is to provide new and useful organic compounds containing pentavalent phosphorus atoms.

A further object of this invention is to provide new and useful organic phosphonate and phosphonothioate compounds.

A more specific object is to provide phosphinylhydrocarbyloxy hydrocarbylphosphonates and phosphonothioates.

Other objects of this invention will appear from the description hereinafter.

In copending application, S.N. 780,223, filed December 15, 1958, there are disclosed and claimed compounds of the formula

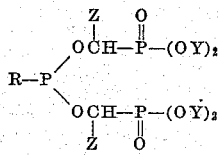

in which R is a hydrocarbyl radical free from aliphatic unsaturation and contains from 1 to 12 carbon atoms, Z is selected from the class consisting of hydrogen and hydrocarbyl radicals free from aliphatic unsaturation and containing from 1 to 11 carbon atoms, and Y is selected from the group consisting of alkyl and haloalkyl radicals of from 1 to 12 carbon atoms, and a method of making them. Those compounds can be described as being hydrocarbylphosphonite esters having two phosphinylhydrocarbyloxy radicals attached to the phosphorus atom thereof. They can also be classified as phosphonite-phosphonate type compounds which describes the types of phosphorus linkage which exist therein.

This invention is directed to new and useful phosphonate and phosphonothioate compounds of the general formula

wherein R is a hydrocarbyl radical which is free from aliphatic unsaturation and which contains from 1 to 12 carbon atoms, R' is selected from the group consisting of hydrogen and hydrocarbyl radicals which are free from aliphatic unsaturation and which contain from 1 to 11 carbon atoms, each Y is selected from the group consisting of hydrocarbyl, hydrocarbyloxy, halohydrocarbyl, and halohydrocarbyloxy radicals which are free from aliphatic unsaturation and which have from 1 to 12 carbon atoms, and E is selected from the group consisting of oxygen and sulfur.

These compounds can be characterized as hydrocarbylphosphonates or hydrocarbylphosphonothioates having phosphinylhydrocarbyloxy radicals attached to the phosphorus atom thereof. They are also referred to in this specification by the general terms of phosphonate-phosphonates, phosphonate-phosphinates, phosphonate-phosphine oxide derivatives, or their phosphonothioate counterparts, to depict the types of phosphorus linkages which exist in the compounds. For example,

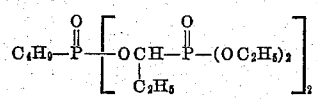

is bis[1-(diethoxyphosphinyl)propyl]butylphosphonate and is generally referred to as a phosphonate-phosphonate type of compound, whereas

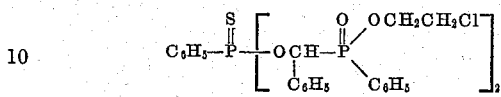

is bis[α-(2-chloroethoxyphenylphosphinyl)benzyl]phenylphosphonothioate and is generally referred to as a phosphonothioate-phosphinate; and

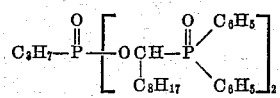

is bis[1-(diphenylphosphinyl)nonyl]propylphosphonate, and is classified as a phosphonate-phosphine oxide derivative.

The phosphinylhydrocarbyloxy hydrocarbylphosphonate and phosphonothioate compounds of this invention can be prepared by oxidation or thionation of a phosphinylhydrocarbyloxy hydrocarbylphosphonite. For example, by contacting a phosphonite-phosphonate compound, such as bis[1-(dimethoxyphosphinyl)ethyl]methylphosphonite with an oxidizing agent, there will be produced the bis[1-(dimethoxyphosphinyl)ethyl]methylphosphonate, which can be classified as a phosphonate-phosphonate type compound. If sulfur is reacted with the above phosphonite-phosphonate, bis[1-(dimethoxyphosphinyl)ethyl]methylphosphonothioate is prepared, which compound is classified as a phosphonothioate-phosphonate type of compound. By such treatment the phosphonite trivalent phosphorus atom is oxidized to the pentavalent state and has an oxygen or sulfur atom attached thereto without disturbing the linkages of that phosphorus atom to the other groups of the molecule.

Other examples of phosphonate-phosphonate starting materials and the products derived therefrom when the phosphonite-phosphonate compound is treated with an oxidizing agent are:

Bis[1-(dibutoxyphosphinyl)butyl]butylphosphonite to obtain bis[1-(dibutoxyphosphinyl)butyl]butylphosphonate, Bis{α-[(2-chloropropoxy)phosphinyl]benzyl}2-ethylhexylphosphonite to obtain bis{α-[bis(2-chloropropoxy)phosphinyl]benzyl}2-ethylhexylphosphonate, Bis[1-(hexyloxypropoxyphosphinyl)dodecyl]p-tolylphosphonite to obtain bis[1-(hexyloxypropoxyphosphinyl)dodecyl]-p-tolylphosphonate, Bis{α-[(3-chloro-2-bromopropoxy)phenoxyphosphinyl]-β-naphthyl}ethylphosphonite to obtain bis{α-[(3-chloro-2-bromopropoxy)phenoxyphosphinyl]-β-naphthyl}ethylphosphonate, Bis{1-[(2,4,6-trichlorophenoxy)-p-tolyloxyphosphinyl]-octyl}mesitylphosphonite to obtain bis{1-[(2,4,6-trichlorophenoxy)-p-tolyloxyphosphinyl]octyl}mesitylphosphonate, and Bis{α-[(2-chloroethoxy)ethoxyphosphinyl]-α-naphthyl}-phenylphosphonite to obtain bis{α-[(2-chloroethoxyethoxyphosphinyl]-α-naphthyl}phenylphosphonate.

When a phosphonite-phosphonate of the above general type is reacted with sulfur, phosphonothioate-phosphonate compounds are obtained. Examples are:

O,O-bis[1-(diamyloxyphosphinyl)heptyl]methylphosphonite to obtain O,O-bis[1-(diamyloxyphosphinyl)-heptyl]methylphosphonothiolate, O,O-bis{α-[bis(chloroethoxy)phosphinyl]-2-phenyl-
ethyl}biphenylylphosphonite to obtain O,O-bis{α-[bis-
(chloroethoxy)phosphinyl]-2-phenylethyl}biphenyl-
ylphosphonothioate, O,O-bis{1-[(2-chloroethoxy)(4-bromobutoxy)phosphin-
yl]undecyl}β-naphthylphosphonite to obtain O,O-bis-
{1-[(2-chloroethoxy)(4-bromobutoxy)phosphinyl]-
undecyl}β-naphthylphosphonothioate, and O,O-bis{α-[(2,4-dimethylphenoxy)phenoxy phosphinyl]-
2,3-dimethylheptyl}cyclohexylphosphonite to obtain
O,O-bis{α-[(2,4-dimethylphenoxy)phenoxyphosphin-
yl]dimethylheptyl}cyclohexylphosphonothioate.

When a phosphonite-phosphinate compound, i.e., a compound of the formula

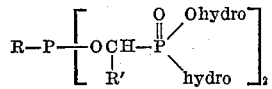

where R, and R' are as defined above and hydro denotes a hydrocarbyl or a halohydrocarbyl radical free from aliphatic unsaturation and having 1 to 12 carbon atoms, is treated with an oxidizing agent there is obtained a phosphonate-phosphinate compound. Examples of such reactants and resulting products are:

Bis[1-(ethoxyphenylphosphinyl)propyl[β-methyl-α-
naphthylphosphonite to obtain bis[1-(ethoxyphenyl-
phosphinyl)propyl]β-methyl-α-naphthylphosphonate, Bis{α[(3-chloropropoxy)ethylphosphinyl]-2,5-dimethyl-
benzyl}cyclopentylphosphonite to obtain bis{α-[(3-
chloropropoxy)ethylphosphinyl]-2,5-dimethylbenzyl}-
cyclopentylphosphonate, Bis{1-[p-iodophenoxy)(p-iodophenyl)phosphinyl]un-
decyl}propylphosphonite to obtain bis{1-[(p-iodo-
phenoxy)(p-iodophenyl)phosphinyl]undecyl}propyl-
phosphonate, Bis[1-(phenoxyphenylphosphinyl)propyl]cumylphos-
phonite to obtain bis[1-(phenoxyphenylphosphinyl)-
propyl]cumylphosphonate, and Bis[α-(hexyloxyhexylphosphinyl)benzyl]hexylphospho-
nite to obtain bis[α-(hexyloxyhexylphosphinyl)ben-
zyl]hexylphosphonate.

Examples of phosphonite-phosphinate reactants and the thionated products thereof are:

Bis[1-(ethoxyethylphosphinyl)propyl]methylphosphonite
to obtain O,O-bis[1-(ethoxyethylphosphinyl)propyl]-
methylphosphonothioate, Bis{α-[(ethoxy)ethylphosphinyl]ethyl}benzylphospho-
nite to obtain O,O-bis{α-[(ethoxy)ethylphosphinyl]-
ethyl}benzylphosphonothioate, Bis{1-[(2,4,6-tribromophenoxy)phenylphosphinyl]hex-
yl}p-tolylphosphonite to obtain O,O-bis{1-[(2,4,6-tri-
bromophenoxy)phenylphosphinyl]hexyl}p-tolylphos-
phonothioate, Bis[α-(propoxyphenylphosphinyl)-2,4-dimethylbenzyl]-
α-naphthylphosphonite to obtain O,O-bis[α-(propoxy-
phenylphosphinyl)-2,4-dimethylbenzyl]α-naphthyl-
phosphonothioate, Bis{1-[(hexyloxy)ethylphosphinyl]methyl}(2-ethyl-
hexyl)phosphonite to obtain O,O-bis{1-[(hexyloxy)-
ethylphosphinyl]methyl}(2-ethylhexyl) phosphonothio-
ate, and Bis[α-(methoxyethylphosphinyl)benzyl]propylphos-
phonite to obtain O,O-bis[α-(methoxyethylphosphin-
yl)benzyl]propylphosphonothioate.

Compounds of the formula

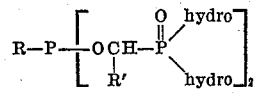

wherein R, R', and hydro are as defined above, i.e., phosphonitephosphine oxide derivatives, react with an oxidizing agent to obtain phosphonate-phosphine oxide type compounds. Examples of such reactants and the resulting products are Bis[1-(diethylphosphinyl)ethyl]ethylphosphonite to ob-
tain bis[1-(diethylphosphinyl)ethyl]ethylphosphonate, Bis{α-[dipropylphosphinyl]benzyl}phenylphosphonite to
obtain bis{α-[dipropylphosphinyl]benzyl}phenylphos-
phonate, Bis[1-(diphenylphosphinyl)butyl]p-tolylphosphonite to
obtain bis[1-(diphenylphosphinyl)butyl]p-tolylphos-
phonate, Bis[1-(propylphenylphosphinyl)hexyl]-α-naphthyl-
phosphonite to obtain bis[1-(propylphenylphosphinyl)-
hexyl]-α-naphthylphosphonate, and Bis{1-[bis(p-fluorophenyl)phosphinyl]-α-naphthyl}-
phenylphosphonite to obtain bis{1-[bis(p-fluorophen-
yl)phosphinyl]-α-naphthyl}phenylphosphonate.

When a phosphonite-phosphine oxide compound of the above general type is reacted with sulfur the respective phosphonothioate-phosphine oxide derivatives are prepared. Examples of such reactants and the thionated products are:

Bis[1-(dipropylphosphinyl)ethyl]phenylphosphonite to
obtain O,O-bis[1-(dipropylphosphinyl)ethyl]phenyl-
phosphonothioate, Bis[α-(diphenylphosphinyl)benzyl]decylphosphonite to
obtain O,O-bis[α-(diphenylphosphinyl)benzyl]decyl-
phosphonothioate, Bis{α-[didecylphosphinyl]cyclohexyl}cyclohexylphos-
phonite to obtain O,O-bis{α-[didecylphosphinyl]cyclo-
hexyl}cyclohexylphosphonothioate, and Bis{α-[(p-chlorophenyl)propylphosphinyl]benzyl}amyl-
phosphonite to obtain O,O-bis{α-[(p-chlorophenyl)-
propylphosphyl]benzyl}amylphosphonothioate.

I have found that a wide variety of oxidizing agents convert the phosphite trivalent phosphorous atom of the diphosphinylhydrocarbyloxy hydrocarbylphosphonites to the pentavalent state and supply an oxygen atom thereto without disturbing the linkages of that phosphorus atom to the other groups of the molecule. Some of those which are preferred for making the compounds of this invention are the peroxycarboxylic acids, both aromatic and aliphatic, hydroperoxides, hydrogen peroxide, ozone, oxygen, and nitrogen oxides such as nitrogen tetroxide. Air may be used but it is not preferred. Although the more common inorganic oxidizing agents, such as $KMnO_4$, $CrO_3$, etc., would accomplish the oxidation, they are not desirable for reasons of expense, salt by-product complications, etc. To prepare the diphosphinylhydrocarbyloxy hydrocarbylphosphonothioates of this invention, elemental sulfur is preferably used.

In either case, i.e., whether the phosphonate or phosphonothioate compounds are being prepared, the respective phosphinylhydrocarbyloxy hydrocarbylphosphonite is usually contacted with a stoichiometric amount or slight excess of oxidizing agent or sulfur. Any excess oxidizing agent or sulfur can easily be recovered by known physical means, e.g., filtration, volatilization, extraction, etc.

Reaction of the respective phosphinylhydrocarbyloxy hydrocarbylphosphonite and the oxidizing agent or sulfur can take place at room temperature. However, when using the highly reactive oxidizing agents, it is often preferred to cool the mixture, generally to between —70° C. and 20° C., depending upon which reactants are combined, to control the rate of the resulting exothermic reaction. On the other hand, the reaction of the respective phosphinylhydrocarbyloxy hydrocarbylphosphonites and sulfur mixtures is usually most practically accomplished by warming the mixture to from 50° C. to 100° C. to initiate the reaction, and then to a higher temperature of from 110° C. to 180° C. to insure complete reaction.

The oxidation or thionation of the phosphinylhydrocarboxyloxy hydrocarbylphosphonites is readily conducted in the absence of an inert solvent, or catalyst. However, solvents and catalysts may be employed. The use of solvents may be particularly advantageous when working with the highly active oxidizing agents or the more viscous phosphinylhydrocarbyloxy hydrocarbylphosphonites. Such solvents may be, e.g., benzene, toluene, xylene, dioxane, alkylene halides such as methylene chloride, and methylene bromide, hexane, and mixtures thereof. No particular order of contacting the reactants need be employed. However, the usual procedure is to add the oxidizing agent or sulfur portionwise to the phosphinylhydrocarbyloxy hydrocarbylphosphonite.

The phosphinylhydrocarbyloxy hydrocarbylphosphonates and phosphonothioates of this invention are stable, usually high-boiling materials which range from viscous liquids to waxy or crystalline solids at ordinary temperatures. They are advantageously used as plasticizers, functional fluids and gear and lubricant oil additives. They are useful as biological toxicants in quantities of from 1 to 10 parts per million up to 10,000 parts per million depending upon the nature of the organism. They are useful as lead scavengers in leaded gasolines in quantities which depend upon the amount of lead present in the gasoline, but generally within the range of from 0.05 mole to 10.0 moles of phosphinylhydrocarbyloxy hydrocarbylphosphonate or -phosphonothioate additive per mole of lead in the gasoline. They are useful as fire-retardant additives in quantities of from 0.5% to 25 or more by weight in many polymeric materials such as urea-formaldehyde, phenol-formaldehyde, and epoxy resins, in polyester type materials such as polyterephalate, polyacrylonitrile, and polyamide fibers, poly-urethane and poly-styrene foams, rubber based emulsion type coatings, as well as cellulosic and carbonaceous combustible materials. In the higher concentration ranges, say, in concentrations which may be equivalent by weight to the weight of the polymeric material, plasticizing properties will likewise often be demonstrated.

Example 1

Bis {α-[bis(2-chloroethoxy)phosphinyl]benzyl}phenylphosphonite, prepared by reacting 62.7 g. (0.35 mole) of phenyldichlorophosphine, 129 g. (0.70 mole) of tris(2-chloroethyl) phosphite, and 74.3 g. (0.70 mole) benzaldehyde, was treated with 11.2 g. (0.35 mole) of sulfur flowers. The temperature increases spontaneously to 44 C. The phosphonite-sulfur mixture was heated to 110° C. while stirring, placed under vacuum at 100° C. and then gently heated to a maximum pot temperature of 201° C./1.5 mm. to remove 72.2 g. of dichloroethylene by-product as the distillate. The residue was a viscous, red liquid product, O,O - bis {α - [bis(2 - chloroethoxy)phosphinyl]benzyl}phenyl phosphonothioate, weighing 255.3 g. (96% yield).

Example 2

A 45.7 g. (0.092 mole) portion of bis[1-(diethoxyphosphinyl)propyl] phenylphosphonite was placed in a reaction flask, and 2.4 g. of sulfur was added. The temperature increased spontaneously to 60° C. The mixture was then warmed to 80° C. All of the sulfur had reacted so 0.4 g. more was added and heating was continued to 130° C. There was thus obtained 48.2 g. (99.2% yield) of clear, colorless O,O-bis[1-(diethoxyphosphinyl)propyl] phenylphosphonothioate.

Example 3

To 13.6 g. (0.0254 mole) of bis[1-(ethoxyphenylphosphinyl)ethyl] phenylphosphonite in 20 ml. of toluene 0.7 g. of sulfur was added. The temperature increased spontaneously to 36° C. from room temperature. The mixture was then warmed until all the sulfur present had reacted (80° C.). An additional 0.1 g. of sulfur was added and the mixture was warmed to 115° C. There was thus obtained a pale yellow toluene solution of O,O-bis 1-(ethoxyphenylphosphinyl)ethyl] phenyl phosphonothioate.

Example 4

A reaction flask equipped with a gas dispersion stirrer, Dry Ice condenser, and a thermometer was charged with 26.8 g. (0.054 mole) of bis[1-(diethoxyphosphinyl)-propyl] phenylphosphonite in 30 ml. of methylene chloride. The solution was cooled to −20° C. and a stream of oxygen-ozone mixture was passed into the flask. The ozone output was 38 mg. per liter of oxygen-ozone mixture. The addition was made over a temperature range of −10° C. to −30° C., and after 30 minutes, ozone was no longer being absorbed as indicated by an ozone meter. The mixture was allowed to warm to room temperature and then purged with nitrogen gas to remove dissolved unreacted ozone. The mixture was transferred to a distilling flask and the solvent methylene chloride was removed under vacuum. The residue was concentrated to 100° C./0.8 mm. In this manner there was obtained 26.9 g. of pale, yellow bis[1-(diethoxyphosphinyl)propyl] phenylphosphonate.

I claim:

1. O,O-bis{α - [bis(2-chloroethoxy)phosphinyl]benzyl} phenylphosphonothioate.

2. O,O - bis[1 - (diethoxyphosphinyl)propyl] phenylphosphonothioate.

3. O,O-bis[1-(ethoxyphenylphosphinyl)ethyl] phenylphosphonothioate.

References Cited in the file of this patent
UNITED STATES PATENTS
2,807,636    Buls et al. _____ Sept. 24, 1957

OTHER REFERENCES

Alimov et al.: Bull. Acad. Sci., U.S.S.R., Div. Chem. Sci., pp. 929–934 (1955).